United States Patent
Shaffer et al.

(10) Patent No.: US 10,641,899 B2
(45) Date of Patent: *May 5, 2020

(54) DETECTING SENSOR ORIENTATION CHARACTERISTICS USING MARKER-BASED LOCALIZATION

(71) Applicant: X Development LLC, Mountain View, CA (US)

(72) Inventors: Daniel Shaffer, Mountain View, CA (US); Dirk Holz, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,601

(22) Filed: Nov. 16, 2018

(65) Prior Publication Data

US 2019/0086547 A1    Mar. 21, 2019

Related U.S. Application Data

(63) Continuation of application No. 15/389,888, filed on Dec. 23, 2016, now Pat. No. 10,162,058.

(51) Int. Cl.
*G01S 17/89* (2020.01)
*G01S 17/02* (2020.01)
(Continued)

(52) U.S. Cl.
CPC ............ *G01S 17/89* (2013.01); *G01B 11/002* (2013.01); *G01S 17/026* (2013.01); *G01S 17/06* (2013.01);
(Continued)

(58) Field of Classification Search
CPC ........ G01S 17/89; G01S 17/06; G01S 17/026; G01B 11/002; G05D 1/0236; G05D 1/0244; G05D 2201/0216
See application file for complete search history.

(56) References Cited

U.S. PATENT DOCUMENTS

| 4,796,198 A | 1/1989 | Boultinghouse et al. |
| 10,162,058 B2 * | 12/2018 | Shaffer ................ G01S 17/89 |
| 2007/0222750 A1 | 9/2007 | Ohta |

OTHER PUBLICATIONS

Gao et al., Land-mark Placement for Reliable Localization of Automatic Guided Vehicle in Warehouse Environment, Dec. 6-9, 2015, Proceeding of the 2015 IEEE Conference on Robotics and Biomimetics, Zhuhai, China, pp. 1900-1905.

* cited by examiner

*Primary Examiner* — Toan M Le
(74) *Attorney, Agent, or Firm* — McDonnell Boehnen Hulbert and Berghoff LLP

(57) ABSTRACT

Methods and systems for detecting sensor orientation characteristics using marker-based localization are disclosed herein. In one aspect, a robotic device can: receive a map of a horizontal marker plane that includes mapped positions of a first marker and a second marker arranged in the horizontal marker plane; receive, from a sensor configured to scan a two-dimensional sensor plane, sensor data indicative of positions of the first and second markers relative to the sensor; determine measured positions of the first and second markers based on the sensor data and a current position of the sensor; determine a difference vector between a first vector that connects the mapped positions of the first and second markers and a second vector that connects the measured positions of the first and second markers; and determine, based on the difference vector, an orientation of the two-dimensional sensor plane relative to the horizontal marker plane.

20 Claims, 11 Drawing Sheets

(51) Int. Cl.
*G01S 17/06* (2006.01)
*G01B 11/00* (2006.01)
*G05D 1/02* (2020.01)

(52) U.S. Cl.
CPC ......... *G05D 1/0236* (2013.01); *G05D 1/0244* (2013.01); *G05D 2201/0216* (2013.01)

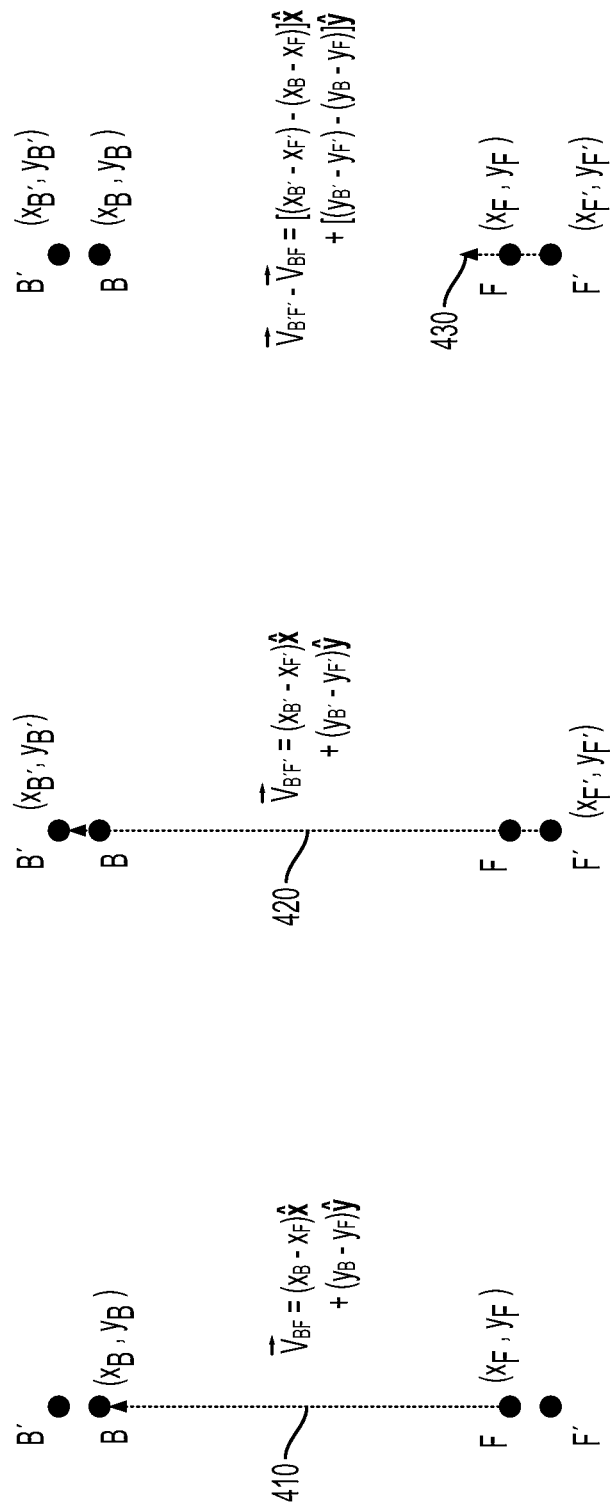

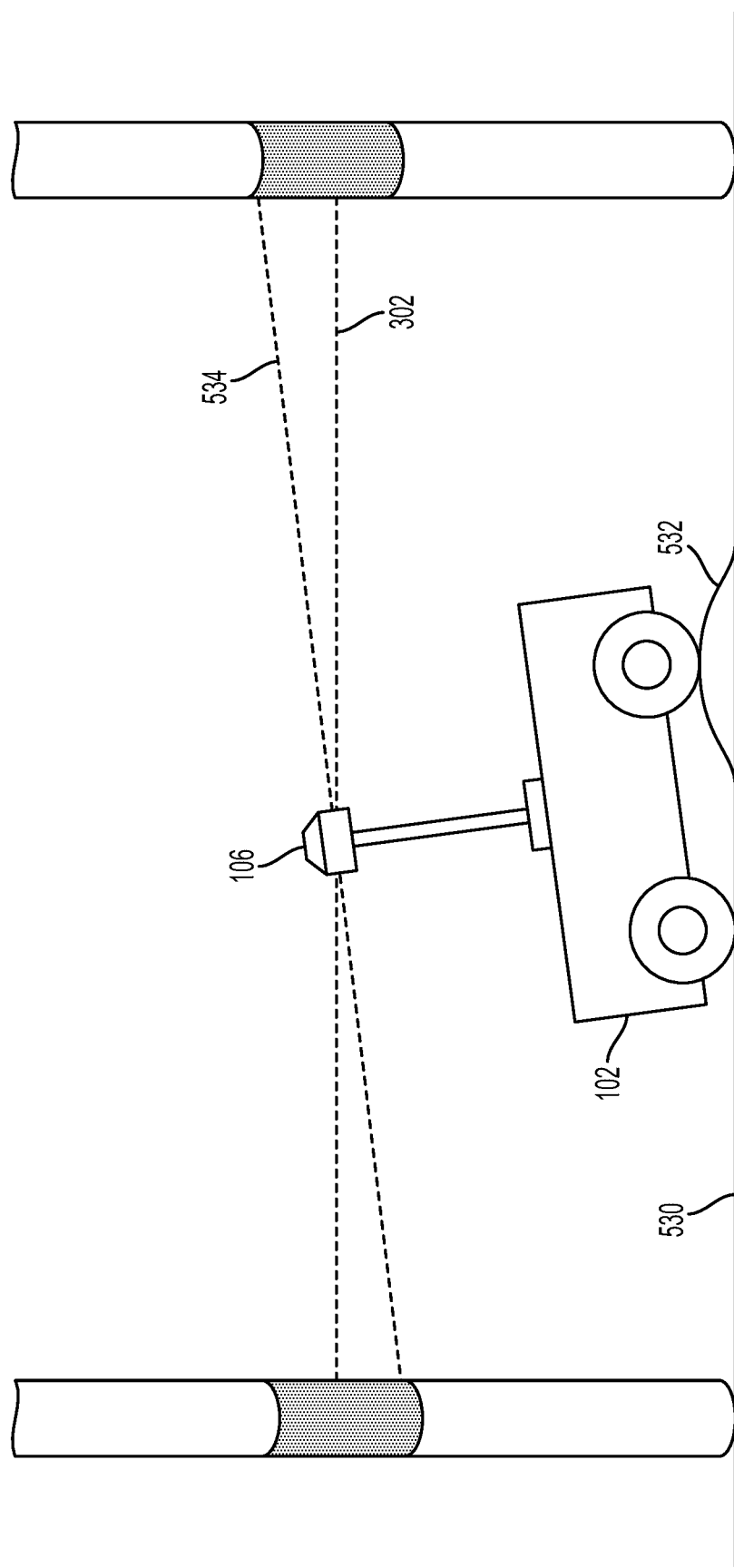

710 Receive, by a computing device, a map of a horizontal marker plane that includes mapped positions of a first marker and a second marker arranged in the horizontal marker plane

720 Receive, from a sensor configured to scan a two-dimensional sensor plane, sensor data indicative of positions of the first and second markers relative to the sensor

730 Determine, by the computing device, measured positions of the first and second markers relative to the map based on the sensor data and a current position of the sensor relative to the map

740 Determine, by the computing device, a difference vector between a first vector that connects the mapped positions of the first and second markers and a second vector that connects the measured positions of the first and second markers

750 Based on the determined difference vector, determine, by the computing device, an orientation of the two-dimensional sensor plane relative to the horizontal marker plane

FIG. 7

DETECTING SENSOR ORIENTATION CHARACTERISTICS USING MARKER-BASED LOCALIZATION

CROSS-REFERENCE TO RELATED APPLICATION

The present disclosure is a continuation of U.S. patent application Ser. No. 15/389,888, filed on Dec. 23, 2016, now U.S. Pat. No. 10,162,058, the entire contents of which are herein incorporated by reference as if fully set forth in this description.

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storage of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

Mobile robotic devices can be used in a number of different environments to accomplish a variety of tasks. For example, mobile robotic devices can deliver items, such as parts or completed products, within indoor environments, such as warehouses, hospitals and/or data centers. When mobile robotic devices are deployed, they can localize themselves within an environment in order to navigate and accomplish tasks within the environment. This localization can be done using various localization sensors and techniques

SUMMARY

In one aspect, a method is provided. A computing device receives a map of a horizontal marker plane that includes mapped positions of a first marker and a second marker arranged in the horizontal marker plane. The computing device receives, from a sensor configured to scan a two-dimensional sensor plane, sensor data indicative of positions of the first and second markers relative to the sensor. The computing device determines measured positions of the first and second markers relative to the map based on the sensor data and a current position of the sensor relative to the map. The computing device determines a difference vector between a first vector that connects the mapped positions of the first and second markers and a second vector that connects the measured positions of the first and second markers. The computing device determines, based on the determined difference vector, an orientation of the two-dimensional sensor plane relative to the horizontal marker plane.

In another aspect, a robotic device is provided. The robotic device includes a sensor configured to scan a two-dimensional sensor plane and a control system configured to perform functions. The functions include: receiving a map of a horizontal marker plane that includes mapped positions of a first marker and a second marker arranged in the horizontal marker plane; receiving, from the sensor, sensor data indicative of positions of the first and second markers relative to the sensor; determining measured positions of the first and second markers relative to the map based on the sensor data and a current position of the sensor relative to the map; determining a difference vector between a first vector that connects the mapped positions of the first and second markers and a second vector that connects the measured positions of the first and second markers; and determining, based on the determined difference vector, an orientation of the two-dimensional sensor plane relative to the horizontal marker plane.

In another aspect, a system is provided. The system includes a first marker and a second marker arranged in a horizontal marker plane, a sensor configured to scan a two-dimensional sensor plane, and a control system configured to perform functions. The functions include: receiving a map of the horizontal marker plane that includes mapped positions of the first marker and the second marker; receiving, from the sensor, sensor data indicative of positions of the first and second markers relative to the sensor; determining measured positions of the first and second markers relative to the map based on the sensor data and a current position of the sensor relative to the map; determining a difference vector between a first vector that connects the mapped positions of the first and second markers and a second vector that connects the measured positions of the first and second markers; and determining, based on the determined difference vector, an orientation of the two-dimensional sensor plane relative to the horizontal marker plane.

In another aspect, a non-transitory computer readable medium is provided. The non-transitory computer readable medium has stored thereon instructions, that when executed by one or more processors of a computing device, cause the computing device to perform functions. The functions include: receiving a map of a horizontal marker plane that includes mapped positions of a first marker and a second marker arranged in the horizontal marker plane; receiving, from a sensor configured to scan a two-dimensional sensor plane, sensor data indicative of positions of the first and second markers relative to the sensor; determining measured positions of the first and second markers relative to the map based on the sensor data and a current position of the sensor relative to the map; determining a difference vector between a first vector that connects the mapped positions of the first and second markers and a second vector that connects the measured positions of the first and second markers; and determining, based on the determined difference vector, an orientation of the two-dimensional sensor plane relative to the horizontal marker plane.

In another aspect, a device is provided. The device includes: means for receiving a map of a horizontal marker plane that includes mapped positions of a first marker and a second marker arranged in the horizontal marker plane; means for receiving, from a sensor configured to scan a two-dimensional sensor plane, sensor data indicative of positions of the first and second markers relative to the sensor; means for determining measured positions of the first and second markers relative to the map based on the sensor data and a current position of the sensor relative to the map; means for determining a difference vector between a first vector that connects the mapped positions of the first and second markers and a second vector that connects the measured positions of the first and second markers; and means for determining, based on the determined difference vector, an orientation of the two-dimensional sensor plane relative to the horizontal marker plane.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 4B illustrates a mapped vector extending between mapped coordinates of a pair of markers, in accordance with an example embodiment.

FIG. 4C illustrates a measured vector extending between measured coordinates of the pair of markers, in accordance with an example embodiment.

FIG. 4D illustrates a difference vector representing a difference between the measured vector and the mapped vector, in accordance with an example embodiment.

FIG. 5C illustrates a side view of the robotic device with the robotic device vertically tilted due to an uneven ground surface, in accordance with an example embodiment.

FIG. 7 is a flowchart of a method, in accordance with an example embodiment.

DETAILED DESCRIPTION

Figure 1:
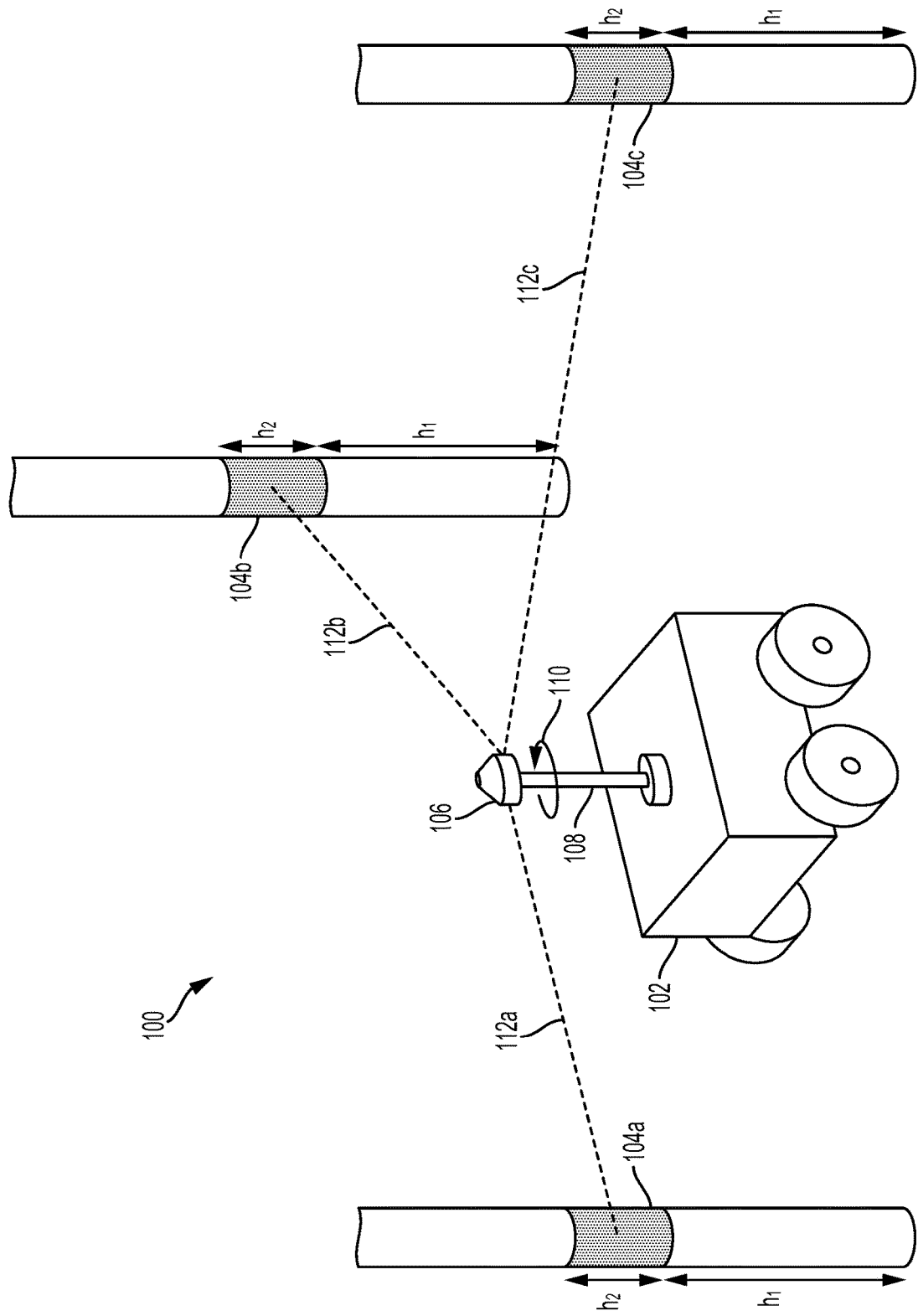
FIG. 1 illustrates an environment through which a robotic device can navigate, in accordance with an example embodiment.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

I. Overview

A robotic device can be configured to localize itself within an environment. One methodology for localizing a robotic device can include using a laser-based sensor onboard the robotic device to detect retroreflective markers arranged within the environment. Given that the detected markers have known locations within the environment, a position and orientation of the robotic device can be determined using triangulation techniques, so long as the sensor detects at least three of the markers. As a result, the robotic device can be localized and guided throughout the environment with high accuracy. In long-term operation, however, estimates of the robotic device's position and orientation can become less precise.

In practice, for instance, the laser-based sensor can be configured to scan a two-dimensional sensor plane, such as by rotating a laser within the two-dimensional sensor plane. Further, the sensor can be mounted on top of the robotic device, perhaps on top of a sensor mast or some other fixture to increase the height of the sensor and improve the sensor's line of sight. The markers can then be arranged at the height of the sensor so the sensor can detect the markers. As such, the markers can be arranged in a two-dimensional marker plane that substantially aligns with the two-dimensional sensor plane. However, when the sensor mast deviates from a substantially vertical orientation, the sensor plane can become tilted relative to the marker plane, thereby resulting in less precise estimates of position and orientation of the robotic device.

For instance, when the sensor is properly aligned (e.g., when the two-dimensional sensor plane is parallel to the horizontal marker plane), sensor data can accurately indicate positions of the markers relative to the sensor within the horizontal marker plane, and the robotic device can accurately localize its position within the map of the environment. However, when the sensor is improperly aligned (e.g., when the two-dimensional sensor plane is vertically tilted relative to the horizontal marker plane), the sensor data can indicate that the markers are farther away from the sensor than they actually are, and the robotic device may not be able to accurately localize its position within the map of the environment using this sensor data. In some examples, even small angular deviations of the sensor mast can be problematic, especially if the detected markers are far away and/or if the sensor mast is particularly long, as the error can be magnified by these long distances.

Accordingly, it can be desirable to determine whether the sensor plane is properly aligned with the horizontal marker plane. In order to do so, the robotic device can be provided with a map of the horizontal marker plane that indicates predefined mapped positions of the markers. A localized position of the robotic device within the map can then be determined. The robotic device can localize its position in a variety of ways, such as by using a global positioning system (GPS) or by triangulating itself using the detected markers as discussed above. If the robotic device uses detected markers for localizing itself, there can be some error introduced into the localization process if the sensor plane is not properly aligned with the marker plane. However, the triangulation process can be robust enough that, with enough detected markers, the robotic device can be accurately localized even with some inaccuracy in individual marker detections.

Based on the predefined mapped positions of the markers and the localized position of the robotic device, the robotic device can then determine an expected position of each marker relative to the robotic device. Thus, when the robotic device receives sensor data and determines measured positions of the markers relative to the robotic device, these measured positions can be compared to the expected positions to determine whether the sensor is properly aligned. In particular, such a comparison can involve determining a first mapped two-dimensional vector that extends between the mapped positions of two markers and determining a second measured two-dimensional vector that extends between the measured positions of the two markers.

The robotic device can then subtract the mapped and measured vectors to determine a two-dimensional difference vector, and the magnitude of the difference vector can determine how tilted the sensor plane is relative to the horizontal marker plane. For instance, if the sensor plane is not tilted or only minimally tilted relative to the horizontal marker plane, then the mapped and measured vectors can be equal or significantly close to being equal, such that the difference vector has a magnitude equal or substantially close to zero. On the other hand, if the sensor plane is significantly tilted relative to the horizontal marker plane, then the mapped and measured vectors can be significantly different, such that the difference vector has a substantially non-zero magnitude.

Further, because the difference vector is a two-dimensional vector in the horizontal marker plane, the x- and y-components of the difference vector can, in some situations, be used to determine a tilt of the sensor plane relative to the x- and y-axes of the horizontal marker plane.

In addition to detecting whether the sensor is tilted and an extent of the tilt angle, the methods and systems disclosed herein can be used to determine a cause of the sensor tilt. There are various situations that may result in the sensor being improperly aligned with the horizontal marker plane. For instance, the sensor can be improperly mounted to the robotic device, the sensor can be mounted to a mast that is oscillating back and forth, or the robotic device itself can be tilted due to an uneven ground surface or due to the robotic device being equipped with a heavy load.

Accordingly, the present disclosure further discusses methods and systems for detecting these causes based on various characteristics of one or more difference vectors determined by the robotic device. For instance, the robotic device can determine multiple difference vectors (e.g., based on multiple different pairs of markers and/or based on multiple measurements of a single pair of markers over a time period), and the robotic device can identify a cause of the sensor tilt by comparing the multiple difference vectors to one another. Further, one or more difference vectors determined by the robotic device can be compared to one or more difference vectors determined by one or more other robotic devices, and, based on this comparison, the robotic device can identify a cause of the sensor tilt.

In some examples, the robotic device can determine, for each detected marker, difference vectors between that detected marker and all other markers (both detected or otherwise known from predefined mapping). The robotic device can then determine covariance matrices for the determined difference vectors as well as a variance for the magnitudes of the difference vectors. If the variance deviates significantly from zero, then this can indicate that the sensor plane is tilted relative to the marker plane.

Further, an improperly mounted sensor can result in a fixed offset between the sensor plane and the marker plane, such that the determined difference vectors can be linearly transformed as the robotic device navigates throughout the environment. As such, eigenvalues and eigenvectors of the covariance matrices can be used to determine whether the sensor is improperly mounted.

Conversely, an oscillating sensor can result in a time-varying offset between the sensor plane and the marker plane, such that the difference vectors measured by the robotic device can significantly vary over a short period of time. As such, the robotic device can determine whether the sensor is oscillating based on the time-varying characteristics of the difference vectors. These and other examples will be discussed in further detail below.

II. Localization of a Robotic Device Within a Marker System

FIG. 1 depicts an environment 100 through which a robotic device 102 can navigate, in accordance with an example embodiment. The environment 100 can be an indoor environment (e.g., part or all of a warehouse, a factory, office space), an outdoor environment (e.g., part or all of a parking lot, road network, park, farmland), or a combination indoor/outdoor environment (e.g., a building and an associated parking lot and/or road network). Many other example environments are possible as well.

The environment 100 can include a number of markers 104a, 104b, 104c arranged at various positions within the environment 100. While FIG. 1 depicts three markers, in other examples there can be additional or fewer markers. The markers 104a, 104b, 104c can be detected by various sensors. For instance, in the present examples, the markers will be discussed as being suited for optical detection. As such, the markers 104a, 104b, 104c can include a retroreflective material for reflecting light from a laser scanner. However, other examples are possible as well. For instance, the markers can be detectable by ultrasonic sensors, motion capture sensors, infrared sensors, or the like.

The markers 104a, 104b, 104c can take on various shapes and forms. For instance, the markers can be spherical, cylindrical, planar, cubical, or the like, and can be mounted to various structures within the environment 100 or can stand on their own. As shown, the markers 104a, 104b, 104c are cylindrical markers mounted on posts. However, other examples are possible as well.

The robotic device 102 can be any one or more steered vehicle(s) capable of following a path. For example, the robotic device 102 can be a fork truck, such as any Occupational Safety and Health Administration (OSHA) Class 1 or Class 3 powered industrial truck. The robotic device 102 can include onboard software and/or hardware to facilitate localization and navigation of the robotic device 102 within the environment 100. For instance, the robotic device 102 can include one or more onboard sensors, such as one or more navigation lasers, laser scanners, cameras, and/or other sensors. The laser scanners can be used to localize the robotic device using reflector-based localization and can include one or more laser scanners provided by SICK AG of Waldkirch, Germany, HOKUYO AUTOMATIC CO. LTD of Osaka, Japan, and/or KEYENCE CORPORATION of Osaka, Japan.

In practice, the robotic device 102 can include a laser scanner 106 for detecting the markers 104a, 104b, 104c. The laser scanner 106 can be configured to scan a two-dimensional area for markers. For instance, the laser scanner 106 can scan a two-dimensional area by rotating within a two-dimensional sensor plane as indicated by the arrow 110. The laser scanner 106 can perform full, 360-degree rotations or can perform limited rotations covering a smaller two-dimensional area, such as a 270-degree scan or a 180-degree scan. Other examples are possible as well.

As shown in FIG. 1, the laser scanner 106 can be coupled to a mast 108 of the robotic device 102. The mast 108 can extend vertically from the robotic device 102, thereby improving the line of sight of the laser scanner 106 by reducing interference from objects closer to the ground. With the laser scanner 106 elevated above the robotic device 102, the markers 104a, 104b, 104c can be arranged at a particular height $h_1$ above the ground, such that the centers of the markers are positioned at approximately the same height as the laser scanner 106. As such, the markers can be arranged in a horizontal marker plane substantially parallel to the ground. Further, the markers 104a, 104b, 104c themselves can have a particular height $h_2$ so the laser scanner 106 can still detect the markers even if the markers are not perfectly aligned with the laser scanner 106 or if the laser scanner 106 becomes tilted.

While scanning, the laser scanner 106 can emit light (e.g., in the form of a laser beam) and can detect any light that is reflected back toward the laser scanner 106. Based on various characteristics of the reflected light (e.g., based on an intensity and a time-of-flight of the detected light), the laser scanner 106 or some other computing device can identify the presence of a marker and the location of the marker relative to the laser scanner 106. As shown, for instance, the laser scanner can emit light along path 112a. The light can reflect off marker 104a and return to the laser scanner 106 where the reflected light is detected by the laser scanner 106. Based on an intensity of the reflected light, the laser scanner 106 can determine that marker 104a is located along path 112a, and, based on a time-of-flight of the reflected light, the laser scanner 106 can determine a distance of marker 104a from the laser scanner 106 along path 112a. The laser scanner 106 can employ similar processes to detect marker 104b along path 112b and marker 104c along path 112c.

Figure 2A:
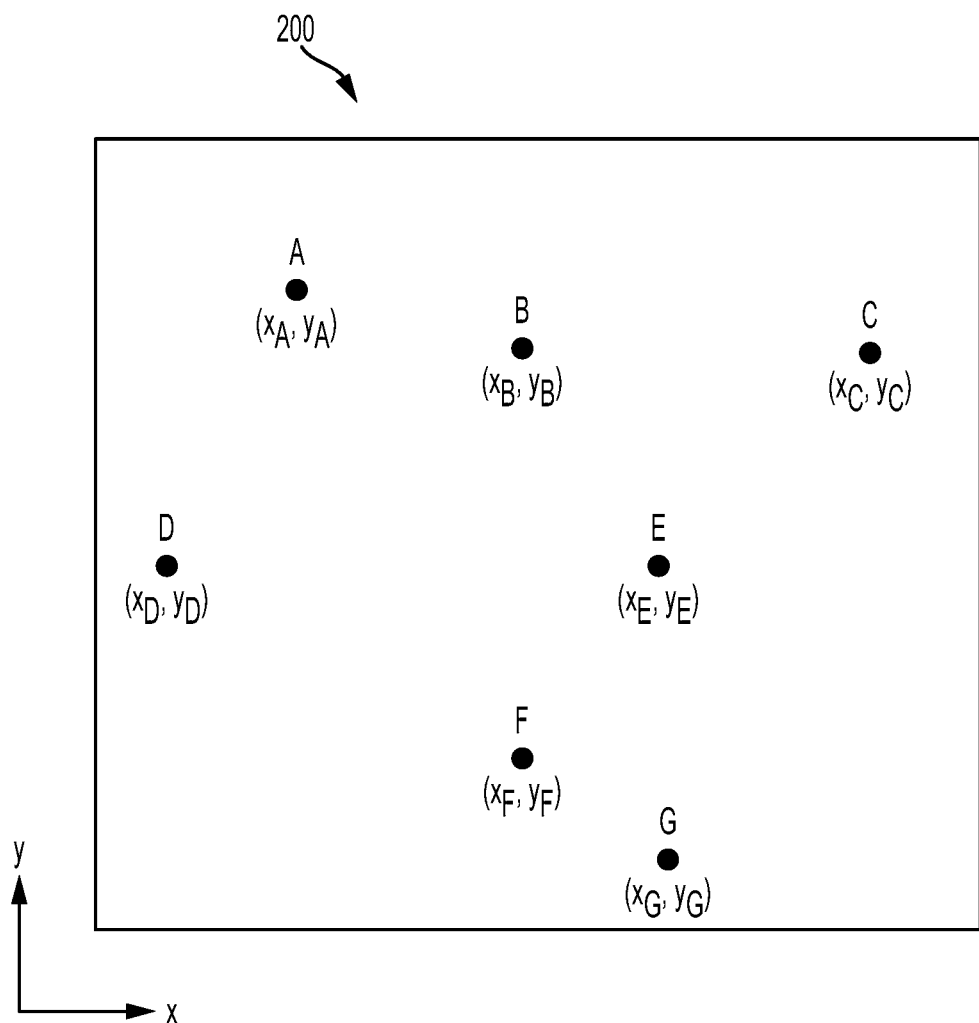
FIG. 2A illustrates a map of a two-dimensional marker plane that shows mapped locations of markers in the two-dimensional marker plane, in accordance with an example embodiment.

Turning next to FIG. 2A, a map 200 of the horizontal marker plane is illustrated, in accordance with an example embodiment. As noted above, the markers can be positioned in a horizontal plane within the environment 100. The map 200 can then indicate the positions of the markers in the horizontal plane by associating two-dimensional coordinates with each marker. The two-dimensional, coordinates can be in units of distance (e.g., meters, centimeters, etc.) or they can be based on some arbitrary unit. As shown, for instance, the map 200 indicates an x-coordinate and a y-coordinate for markers A, B, C, D, E, F, and G. These two-dimensional coordinates can be determined and associated with each marker in various ways. For example, when arranging the markers within the environment 100, the markers can be positioned at locations having predefined or otherwise known coordinates. Alternatively, the coordinates of the markers can be determined by performing one or more high accuracy scans of the environment to determine the positions of the markers within the horizontal marker plane. Other examples are possible as well.

The map 200 of the horizontal marker plane can be provided to the robotic device 102, and the robotic device 102 can localize its position and/or a position of the laser scanner 106 relative to the map 200 of the horizontal marker plane.

In some examples, the robotic device 102 can determine a position of the laser scanner 106 relative to the map 200 based on light detected by the laser scanner 106 during a scan. As discussed above, for instance, the laser scanner 106 can scan a two-dimensional sensor plane by emitting and detecting light in a rotating pattern.

Figure 2B:
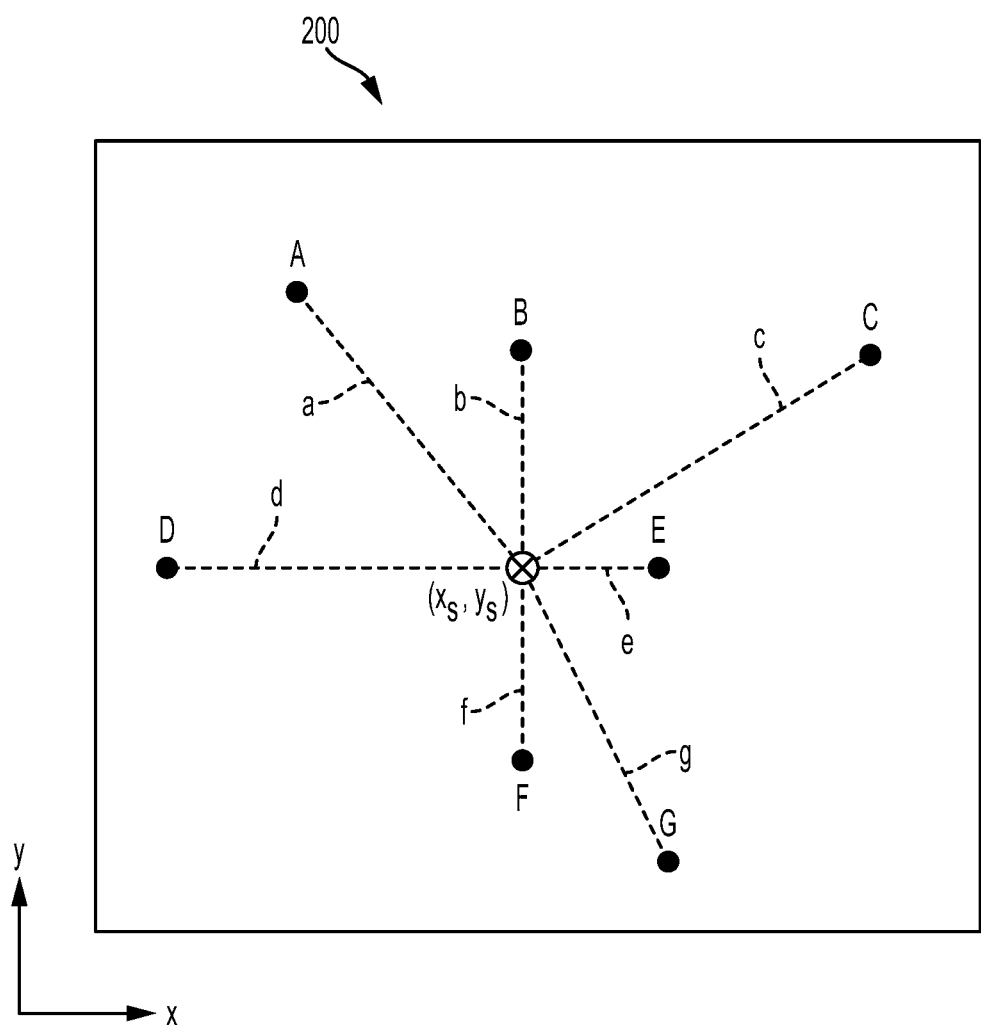
FIG. 2B illustrates a map of the two-dimensional marker plane that shows detections of the markers in the two-dimensional marker plane by a robotic device, in accordance with an example embodiment.

FIG. 2B illustrates the map 200 of the horizontal marker plane that shows detections of markers by the laser scanner 106. As shown, the laser scanner 106 can detect marker A by emitting and detecting light along path a; the laser scanner 106 can detect marker B by emitting and detecting light along path b; the laser scanner 106 can detect marker C by emitting and detecting light along path c; the laser scanner 106 can detect marker D by emitting and detecting light along path d; the laser scanner 106 can detect marker E by emitting and detecting light along path e; the laser scanner 106 can detect marker F by emitting and detecting light along path f, and the laser scanner 106 can detect marker G by emitting and detecting light along path g.

Given the locations of the markers in the horizontal marker plane, a location and pose of the laser scanner 106 and/or robotic device 102 relative to the horizontal marker plane can be computed using triangulation, so long as the laser scanner 106 can detect at least three of the markers. To do so, the robotic device 102 can establish an association between any detected markers and the known mapped markers having known locations in the horizontal marker plane. Then, once the known locations are associated with the detected markers, the robotic device 102 can localize itself relative these known locations and thus determine a location of the robotic device 102 relative to the horizontal marker plane. Further, the robotic device 102 can use prior location data to determine a pose of the robotic device 102.

In practice, the robotic device 102 can determine, based on the reflected light along paths a-g, a position (e.g., a distance and a direction) of each marker A-G relative to the laser scanner 106. Once the robotic device 102 determines the relative positions of the markers, the robotic device can determine a position of the laser scanner 106 within the map 200. By way of example, the markers A-G can be in a scattered arrangement, such that the positions of the markers do not form a repeating positional pattern. That way, for any given position of the laser scanner 106, the measured positions of the markers A-G can correspond to a distinct position of the laser scanner 106 relative to the map 200. Accordingly, using the measured positions of the markers A-G, the robotic device 102 can determine two-dimensional sensor coordinates ($x_s$, $y_s$) of the laser scanner 106 within the map 200 of the horizontal marker plane, as well as an orientation or heading angle of the robotic device 102.

In some examples, the robotic device 102 can use various other methods or devices to localize the laser scanner within the map 200. For instance, the robotic device 102 can include additional sensors, such as a motion capture camera or one or more additional laser scanners configured to localize the robotic device 102. These additional sensors can be configured to detect the same markers A-G or can instead be configured to detect a separate set of markers. In any case, the robotic device 102 can use these additional sensors to localize itself relative to the detected markers and determine the two-dimensional sensor coordinates (xs, ys) of the laser scanner 106 within the map 200 of the horizontal marker plane. Moreover, once initial sensor coordinates of the laser scanner 106 are determined, the robotic device 102 can use dead reckoning techniques (e.g., based on a detected wheel speed and direction of travel and/or by using an inertial measurement unit (IMU)) to determine subsequent sensor coordinates. Other examples are possible as well.

III. Measurement of Sensor Orientation Characteristics

Once the robotic device 102 has determined sensor coordinates of the laser scanner 106 relative to the map 200 of the horizontal marker plane, the robotic device 102 can then determine various orientation characteristics of the laser scanner 106 relative to the horizontal marker plane. The robotic device 102 can make such determinations based on the determined sensor coordinates and measured positions of some or all of the markers relative to the laser scanner 106.

In one example, given that a position and heading of the robotic device 102 is known (e.g., using triangulation techniques as discussed above) and that the laser scanner 106 is located at sensor coordinates $(x_s, y_s)$ as indicated in FIG. 2B, the robotic device 102 can determine an orientation of the laser scanner 106 by measuring the positions of markers B and F relative to the laser scanner 106 and comparing the measured positions to the mapped positions of markers B and F shown in FIG. 2A.

Figure 3:
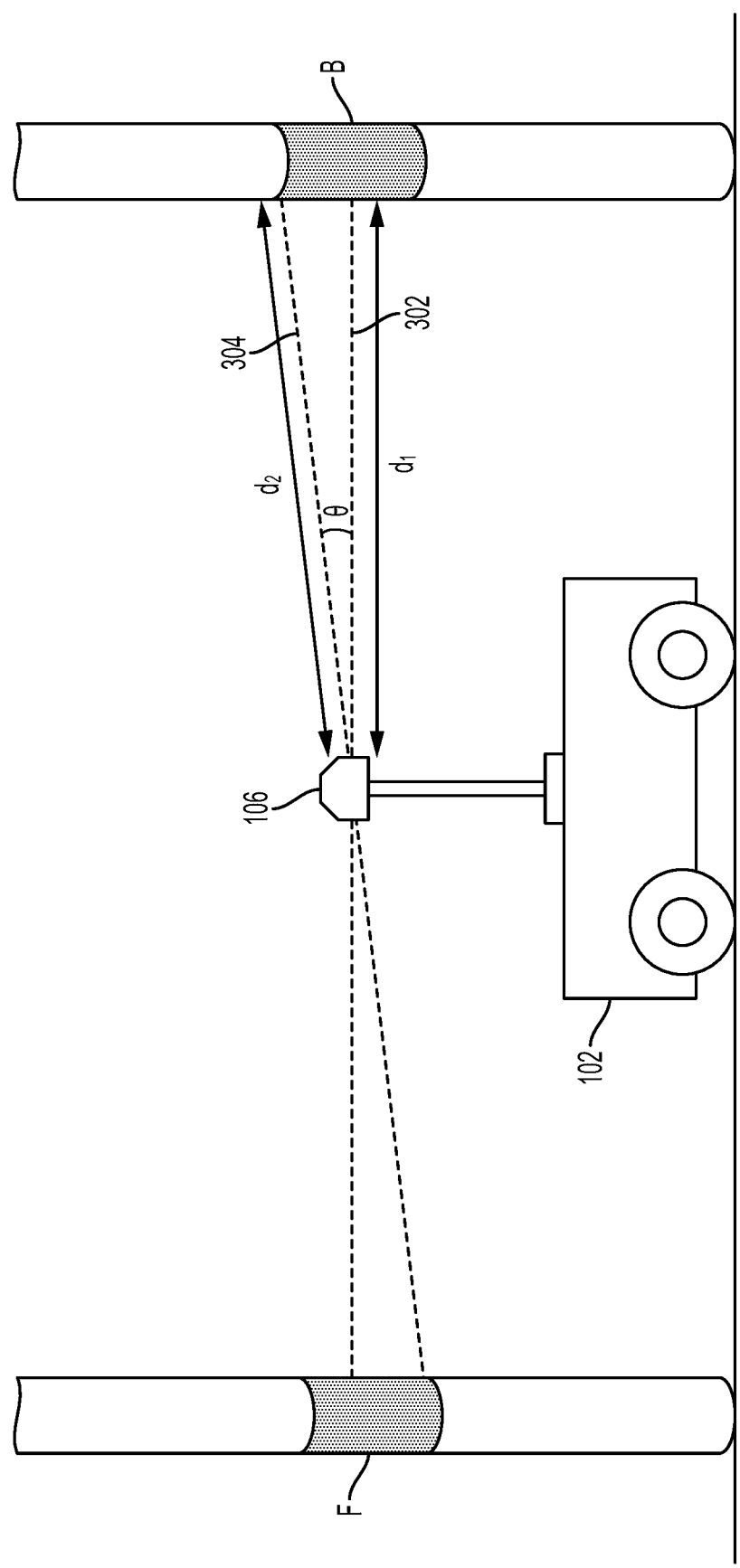
FIG. 3 illustrates a side view of the robotic device in the environment, in accordance with an example embodiment.

Referring to FIG. 3, a side view of the robotic device 102 shows the robotic device 102 positioned at $(x_s, y_s)$ between markers B and F. The laser scanner 106 can emit light towards each of the markers and detect the reflected light from the markers. Based on the detected reflected light, the robotic device 102 can determine positions of markers B and F relative to the laser scanner 106 and, thus, relative to the sensor coordinates $(x_s, y_s)$. Then, based on these determined relative positions, the robotic device 102 can determine measured coordinates of the markers B and F. These measured coordinates can be denoted as $(x_{B'}, y_{B'})$ and $(x_{F'}, y_{F'})$.

Figure 4A:
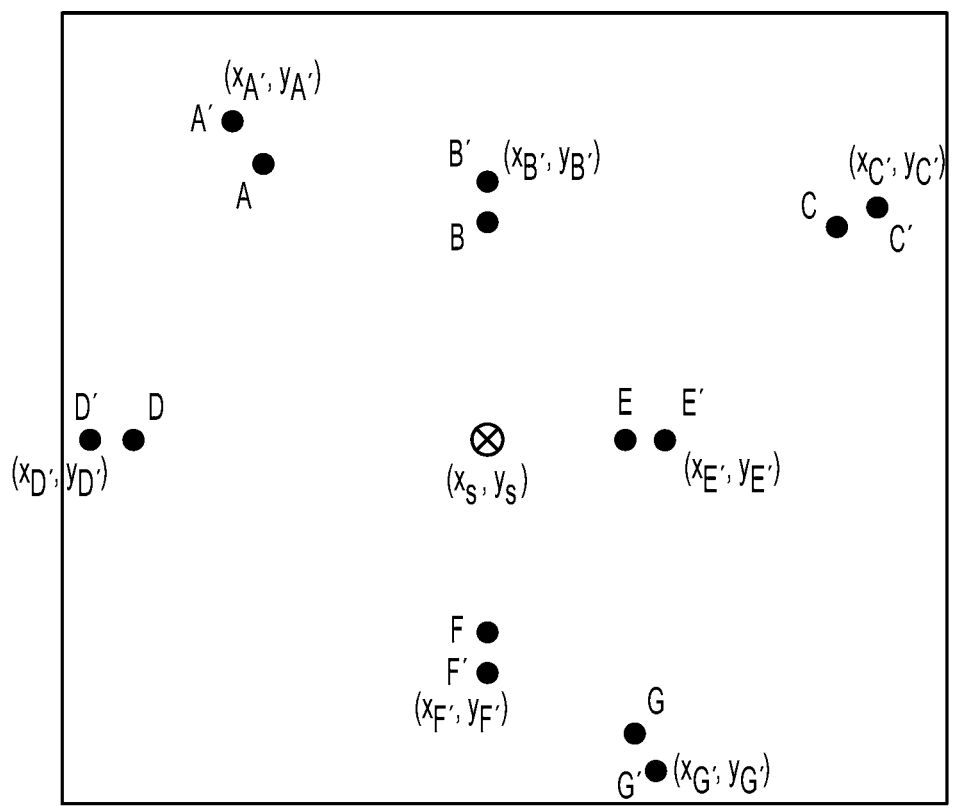
FIG. 4A illustrates a map of the two-dimensional marker plane that shows mapped locations of markers and corresponding measured locations of the markers as detected by the robotic device, in accordance with an example embodiment.

FIG. 4A illustrates the map 200 of the horizontal marker plane with the measured coordinates of markers detected by the robotic device 102 displayed alongside the mapped coordinates of the markers, in accordance with an example embodiment. The values of the measured coordinates, including measured coordinates $(x_{B'}, y_{B'})$ and $(x_{F'}, y_{F'})$, can be affected by an orientation of the laser scanner 106, and/or an orientation of the two-dimensional sensor plane scanned by the laser scanner 106, relative to the horizontal marker plane 302. For instance, as shown in FIG. 3, when the laser scanner 106 is aligned with the horizontal marker plane (i.e., when the sensor plane is parallel to the horizontal marker plane), the laser scanner 106 measures the relative positions of markers B and F along a path within the horizontal marker plane 302. If, however, the laser scanner 106 is vertically tilted with respect to the horizontal marker plane, then the laser scanner 106 measures the relative positions of markers B and F along a vertically tilted path, such as the shown tilted path 304.

Because the tilted path 304 can have a greater length than the path in the horizontal marker plane 302, the markers B and F can appear farther away from the laser scanner 106 when the laser scanner 106 is vertically tilted relative to the horizontal marker plane. As a result, the determined measured coordinates $(x_{B'}, y_{B'})$ and $(x_{F'}, y_{F'})$ of markers B and F can be farther away from the sensor coordinates $(x_s, y_s)$ than the mapped coordinates $(x_B, y_B)$ and $(x_F, y_F)$ of markers B and F, as shown in FIG. 4A. Accordingly, in some examples, the robotic device 102 can determine that the laser scanner 106 is vertically tilted with respect to the horizontal marker plane based on a difference between the measured coordinates and the mapped coordinates.

FIGS. 4B-4D illustrate how the robotic device 102 can determine that the laser scanner 106 is vertically tilted with respect to the horizontal marker plane based on a difference between the measured coordinates and the mapped coordinates, in accordance with an example embodiment. As shown in FIG. 4B, the robotic device 102 can subtract the mapped coordinates $(x_B, y_B)$ and $(x_F, y_F)$ to determine a mapped vector $V_{BF}$ 410 that extends between mapped marker positions B and F. As shown in FIG. 4C, the robotic device 102 can further subtract the measured coordinates $(x_{B'}, y_{B'})$ and $(x_{F'}, y_{F'})$ to determine a measured vector $V_{B'F'}$ 420 that extends between measured marker positions B' and F'. Based on a difference between the mapped vector $V_{BF}$ and the measured vector $V_{B'F'}$, the robotic device 102 can determine an orientation of the laser scanner 106 relative to the horizontal marker plane.

For instance, as noted above, if the laser scanner 106 is aligned with the horizontal marker plane 302, then the determined measured coordinates $(x_{B'}, y_{B'})$ and $(x_{F'}, y_{F'})$ of markers B and F will equal the mapped coordinates $(x_B, y_B)$ and $(x_F, y_F)$, and the measured vector $V_{B'F'}$ will equal the mapped vector $V_{BF}$. On the other hand, if the laser scanner 106 is vertically tilted with respect to the horizontal marker plane 302, then the determined measured coordinates $(x_{B'}, y_{B'})$ and $(x_{F'}, y_{F'})$ of markers B and F will not equal the mapped coordinates $(x_B, y_B)$ and $(x_F, y_F)$, and the measured vector $V_{B'F'}$ will not equal the mapped vector $V_{BF}$. Further, a greater tilt of the laser scanner 106 can result in a greater difference between the measured coordinates and mapped coordinates, as well as the measured vector and the mapped vector.

Accordingly, the robotic device can determine whether the laser scanner 106 is tilted and/or an extent of the tilt angle based on a difference vector in the horizontal marker plane. The difference vector represents the difference between a vector that connects the mapped coordinates of two markers and a vector that connects the measured coordinates of the two markers. For example, as shown in FIG. 4D, the robotic device 102 can subtract the mapped vector $V_{BF}$ from the measured vector $V_{B'F'}$ to determine the difference vector 430. If the determined difference vector is a null vector (or a vector having a magnitude significantly close to zero), then the robotic device 102 can determine that the laser scanner 106 is aligned with the horizontal marker plane 302. If the determined difference vector has a non-zero magnitude (or a magnitude significantly larger than zero), then the robotic device 102 can determine that the laser scanner 106 is vertically tilted with respect to the horizontal marker plane 302. Further, the robotic device 102 can determine an extent of the vertical tilt based on the magnitude of the difference vector. For instance, a larger magnitude can indicate a greater extent of tilt.

In some examples, the robotic device 102 can determine an angle at which the laser scanner 106 is tilted relative to the horizontal marker plane 302. Referring to FIG. 3, for instance, the robotic device 102 can determine a first distance $d_1$ between the laser scanner 106 and marker B along the horizontal marker plane 302 and a second distance $d_2$ between the laser scanner 106 and marker B along the tilted path 304. The robotic device 102 can determine the first distance $d_1$ by subtracting the sensor coordinates $(x_s, y_s)$ from the mapped coordinates $(x_B, y_B)$ of marker B, and the robotic device 102 can determine the second distance $d_2$ by subtracting the sensor coordinates $(x_s, y_s)$ from the measured coordinates $(x_{B'}, y_{B'})$ of marker B. Once $d_1$ and $d_2$ are known, the tilt angle θ can be determined using the law of cosines.

In the above examples, the robotic device 102 is positioned between markers B and F, which can be aligned along the y-axis of the horizontal marker plane, as shown by FIG. 2B. As such, the above operations can be useful for determining a tilt angle of the laser scanner 106 with respect to the y-axis. The tilt angle of the laser scanner 106 with respect to the y-axis can be referred to as a pitch angle of the laser scanner 106. In order to also determine a tilt of the laser scanner 106 with respect to the x-axis of the horizontal marker plane, the robotic device 102 can perform similar operations with respect to markers D and E, which can be aligned along the x-axis of the horizontal marker plane, as shown by FIG. 2B. The tilt angle of the laser scanner 106 with respect to the x-axis can be referred to as a roll angle of the laser scanner 106. To determine the roll angle, the robotic device 102 can determine measured coordinates ($x_{D'}$, $y_{D'}$), ($x_{E'}$, $y_{E'}$) and mapped coordinates ($x_D$, $y_D$), ($x_E$, $y_E$) of markers D and E as well as a measured vector $V_{D'E'}$ and a mapped vector $V_{DE}$. Then, based on a vector difference between the measured vector and the mapped vector as discussed above, the robotic device 102 can determine a tilt of the laser scanner 106 with respect to the x-axis of the horizontal marker plane.

In the above examples, the robotic device 102 is positioned between the various detected markers (i.e., between markers B and F, and between markers D and E). However, in many cases, the robotic device 102 might not be positioned directly between two markers. As such, the robotic device 102 can additionally or alternatively determine an orientation of the laser scanner 106 based on measured positions of markers that are not flanking the robotic device 102.

For instance, with the laser scanner 106 positioned at ($x_s$, $y_s$) as shown in FIGS. 2B and 4A, the robotic device 102 can perform some or all of the above operations to measure positions of markers A and C relative to the laser scanner 106. Based on the relative measured positions of markers A and C, the robotic device 102 can determine measured coordinates ($x_{A'}$, $y_{A'}$), ($x_{C'}$, $y_{C'}$) of markers A and C. Using the measured coordinates, the robotic device 102 can determine a measured vector $V_{A'C'}$ between ($x_{A'}$, $y_{A'}$) and ($x_{C'}$, $y_{C'}$), and, using the mapped coordinates, the robotic device 102 can determine a mapped vector $V_{AC}$ between ($x_A$, $y_A$) and ($x_C$, $y_C$). Further, the robotic device 102 can determine a difference vector by subtracting $V_{AC}$ from $V_{A'C'}$. Based on the determined difference vector, the robotic device 102 can determine whether the laser scanner 106 is vertically tilted with respect to the horizontal marker plane. In particular, a non-zero difference vector can indicate that the laser scanner 106 is vertically tilted, while a null difference vector can indicate that the laser scanner 106 is not tilted.

In this example, because markers A and C are not aligned along the x-axis or y-axis of the horizontal marker plane, and because the robotic device 102 is not positioned directly between markers A and C, any vertical tilt of the laser scanner 106 with respect to either or both of the x-axis and y-axis of the horizontal marker plane can result in a non-zero difference vector. Thus, in such a situation, the robotic device 102 can detect vertical tilt of the laser scanner 106 with respect to either or both of the x-axis and y-axis based on the difference vector having a non-zero magnitude or a magnitude significantly larger than zero.

In some examples, the robotic device 102 can be configured to perform some or all of the above operations multiple times over. By way of example, for a particular marker, the robotic device 102 can determine difference vectors based on the measured and mapped coordinates of the particular marker and of every other detected marker in the environment 100. The robotic device 102 can further repeat these operations for every other detected marker in the environment 100, such that, for each detected marker, the robotic device 102 can determine difference vectors based on the measured and mapped coordinates of that marker and of every other detected marker. Even further, the robotic device 102 can repeat some or all of these operations for the same set of markers over a period of time and/or as the robotic device 102 navigates throughout the environment 100. This can allow the robotic device 102 to determine a cause of the vertical tilt of the laser scanner 106, as discussed in more detail below. Additionally, one or more other robotic devices in the environment 100 can also perform any or all of the above operations, and the difference vectors from the multiple robotic devices can be compared to determine a cause of the vertical tilt of the laser scanner 106, as discussed in more detail below.

Figure 5A:
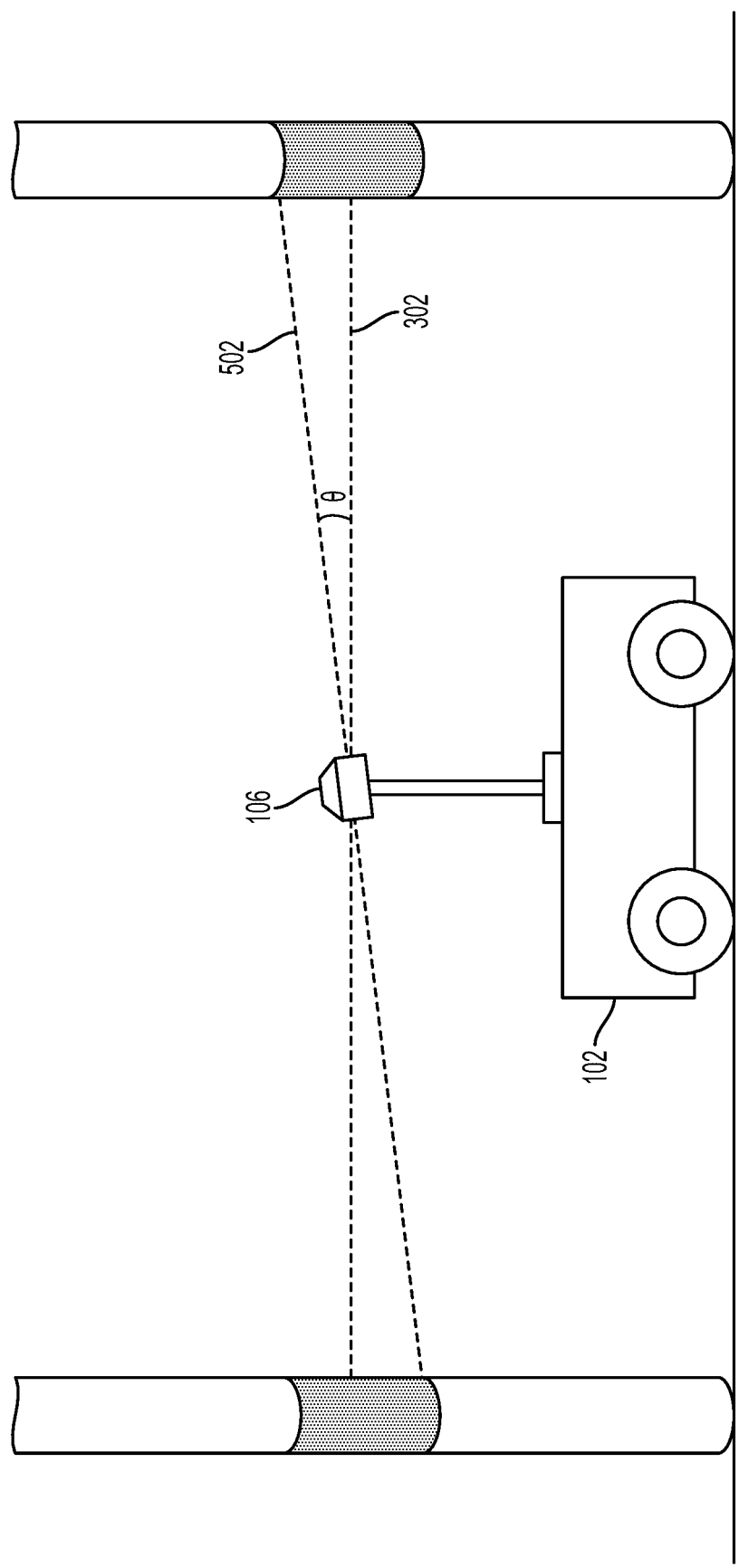
FIG. 5A illustrates a side view of the robotic device with a marker-detecting sensor improperly mounted to the robotic device, in accordance with an example embodiment.

The laser scanner 106, and thus the two-dimensional sensor plane scanned by the laser scanner 106, can be vertically tilted with respect to the horizontal marker plane due to a variety of causes. For instance, as shown in FIG. 5A, the laser scanner 106 can be improperly mounted to the robotic device 102, such that the two-dimensional sensor plane 502 is oriented at a fixed angle θ relative to the horizontal marker plane 302. In such a scenario, because the laser scanner 106 is constantly tilted with respect to the horizontal marker plane 302, the difference vectors determined by the robotic device 102 over time and/or as the robotic device navigates through the environment 100 can have a somewhat consistent non-zero magnitude.

By way of example, while the robotic device 102 is located at a particular location ($x_s$, $y_s$), the robotic device 102 can determine a number of difference vectors, as discussed above, based on the measured and mapped locations of markers A and C (or any other detected markers). If the determined difference vectors each have a significantly similar non-zero magnitude and/or significantly similar non-zero x- and y-values, then the robotic device 102 can determine that the laser scanner 106 is improperly mounted to the robotic device 102.

Similarly, while the robotic device 102 navigates through the environment 100, the robotic device 102 can determine, at various locations, a number of difference vectors, as discussed above, based on the measured and mapped locations of markers A and C (or any other detected markers). Again, if the determined difference vectors each have a significantly similar non-zero magnitude and/or significantly similar non-zero x- and y-values, then the robotic device 102 can determine that the laser scanner 106 is improperly mounted to the robotic device 102.

Further, in situations where the environment 100 includes multiple robotic devices configured to scan for markers and determine difference vectors, the robotic device 102 (or some other computing device) can determine that the laser scanner 106 is improperly mounted to the robotic device 102 by comparing one or more difference vectors determined by the robotic device 102 to one or more difference vectors determined by other robotic devices. For instance, if the robotic device 102 consistently determines difference vectors that have a larger magnitude than difference vectors determined by the other robotic devices, then this can indicate that the laser scanner 106 is improperly mounted to the robotic device 102.

In some examples, the robotic device 102 can be configured to transport a load through the environment 100. For instance, the robotic device 102 can be a fork truck or the like. As such, a weight of the load can cause the robotic device 102 (and also the laser scanner 106) to tilt relative to the ground surface and thus relative to the horizontal marker plane 302. Similar to situations where the laser scanner 106 is improperly mounted to the robotic device 102, the weight of the load can cause the laser scanner 106 to be oriented at a fixed angle relative to the horizontal marker plane 302. Accordingly, the robotic device 102 can employ similar methods to those discussed above in the context of FIG. 5A to determine that the load is causing the robotic device 102 to tilt relative to the ground surface.

Figure 5B:
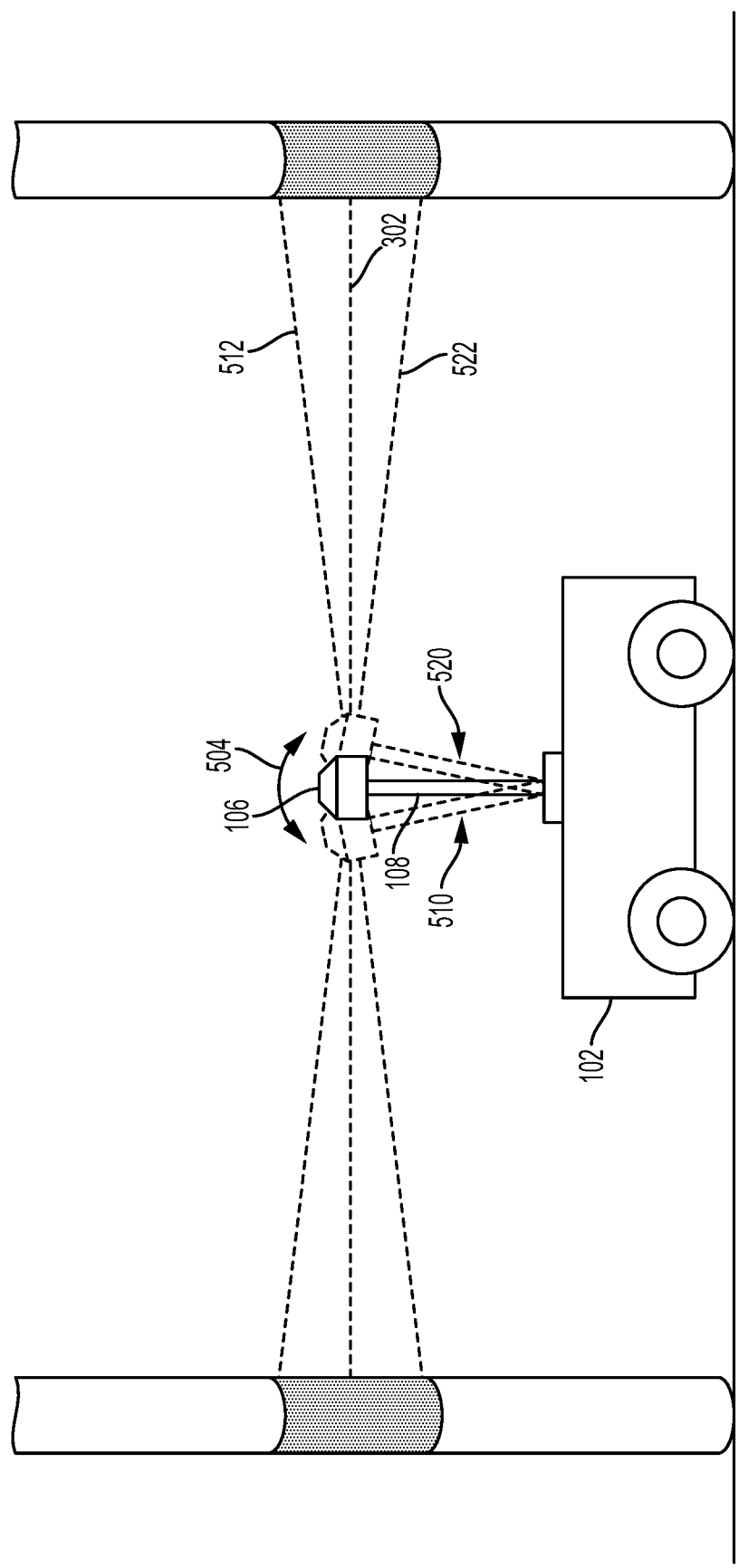
FIG. 5B illustrates a side view of the robotic device with the marker-detecting sensor oscillating between a first position and a second position, in accordance with an example embodiment.

FIG. 5B next illustrates another cause for the laser scanner 106 being vertically tilted relative to the horizontal marker plane 302. As shown, the laser scanner 106 (and perhaps the mast 108) can oscillate back and forth as indicated by arrow 504. Such oscillations may result from a variety of causes, such as vibrations of the robotic device 102, a collision between the robotic device 102 and some other object, abrupt changes in the velocity of the robotic device 102, or the like.

The laser scanner 106 can oscillate between a first position 510 and a second position 520. In the first position 510, the two-dimensional sensor plane can be oriented in a first orientation 512, and; in the second position 520, the two-dimensional sensor plane can be oriented in a second orientation 522. Thus, when the laser scanner 106 oscillates between the first position 510 and the second position 520, the two-dimensional sensor plane oscillates between the first orientation 512 and the second orientation 522.

As the two-dimensional sensor plane oscillates between the first orientation 512 and the second orientation 522, the detected markers can appear farther or nearer to the laser scanner 106 depending on the orientation of the sensor plane. Consequently, the measured positions of the detected markers (and thus the difference vector based on the measured and mapped positions of the detected markers) can vary depending on the orientation of the sensor plane. Accordingly, in some examples, the robotic device 102 can be configured to determine a number of difference vectors over a period of time (perhaps over a short period of time to account for rapid oscillations) for a particular set of detected markers. If the magnitudes of the determined difference vectors vary significantly over the period of time, then the robotic device 102 can responsively determine that the laser scanner 106 is oscillating relative to the horizontal marker plane. For instance, the robotic device 102 can determine that the laser scanner 106 is oscillating if the magnitudes of the difference vectors experience a significant decrease followed by a significant increase over the period of time. Similarly, the robotic device 102 can determine that the laser scanner 106 is oscillating if the magnitudes of the difference vectors experience a significant increase followed by a significant decrease over the period of time.

FIG. 5C next illustrates another cause for the laser scanner 106 being vertically tilted relative to the horizontal marker plane 302. As shown, the robotic device 102 can be configured to traverse a ground surface 530 of the environment 100, and the ground surface 530 can include one or more uneven surfaces 532. For instance, the uneven surface 532 can be a ramp, a speed bump, an imperfection such as a pothole, a misplaced object, or the like. In any case, when navigating through the environment 100, the robotic device 102 can drive over (or otherwise coincide with) the uneven surface 532.

When driving over the uneven surface 532, part or all of the robotic device 102 (including the laser scanner 106) can become vertically tilted relative to the horizontal marker plane 302, such that the two-dimensional sensor plane 534 is also vertically tilted relative to the horizontal marker plane 302. While vertically tilted, the robotic device 102 can determine one or more difference vectors based on measured positions of markers, as discussed above, and because the two-dimensional sensor plane 534 is vertically tilted relative to the horizontal marker plane 302, the determined difference vectors can have a non-zero magnitude.

In order to determine whether a non-zero difference vector is caused by an uneven ground surface, such as uneven surface 532, the robotic device 102 (or some other computing device) can refer to difference vectors generated by one or more other robotic devices. For instance, as noted above, the environment 100 can include a number of robotic devices navigating through the environment 100 and generating difference vectors at various locations throughout the environment 100. Accordingly, if a threshold number of robotic devices generate non-zero difference vectors at or near a particular location within the environment 100, then this can indicate that the ground surface at that particular location is uneven. On the other hand, if only a single robotic device generates a significantly non-zero difference vector at or near the particular location, then this can indicate that the problem is with the single robotic device (e.g., due to sensor oscillation or a mounting error) rather than with the ground surface at that particular location.

Further, in some examples, when the robotic device 102 is tilted due to an uneven ground surface, the robotic device 102 can be configured to determine a slope of the ground surface by determining an angle at which the two-dimensional sensor plane is vertically tilted, as discussed above in the context of FIG. 3.

IV. Computing Device Architecture

Figure 6:
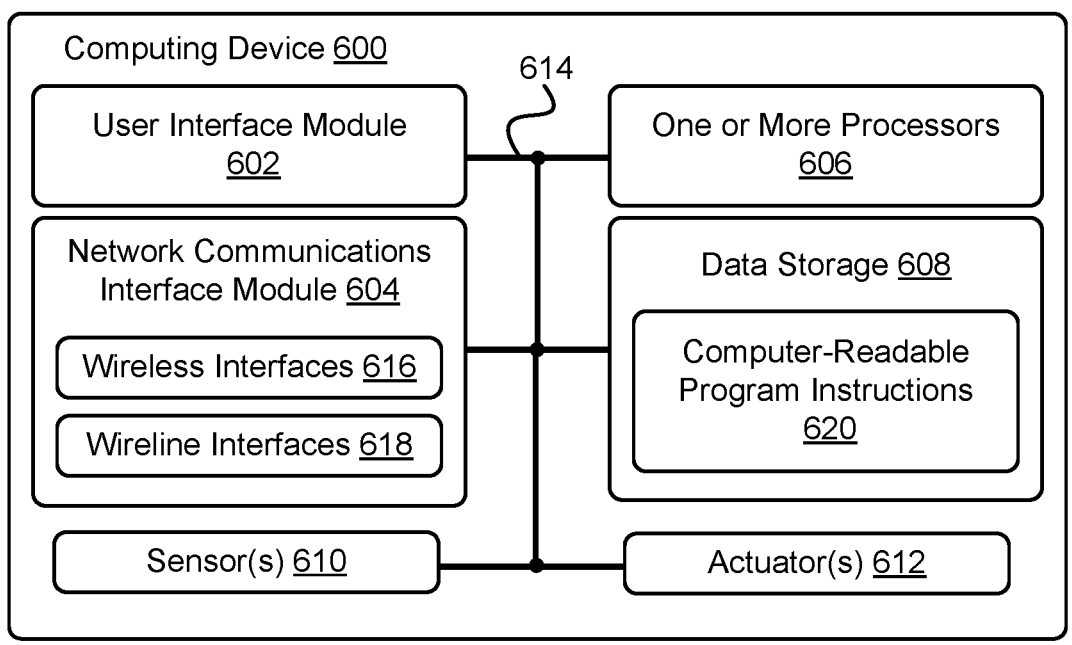
FIG. 6 illustrates a functional block diagram of a computing device, in accordance with an example embodiment.

FIG. 6 is a functional block diagram of a computing device 600 (e.g., system), in accordance with an example embodiment. In particular, the computing device 600 shown in FIG. 6 can be configured to perform one or more functions related to the robotic device 102 and/or method 700. The computing device 600 can include a user interface module 602, a network-communication interface module 604, one or more processors 606, data storage 608, one or more sensors 610, and one or more actuators 612, all of which may be linked together via a system bus, network, or other connection mechanism 614. In some embodiments, the computing device 600 can be configured to act as part or all of a warehouse control system.

The user interface module 602 can be operable to send data to and/or receive data from external user input/output devices. For example, the user interface module 602 can be configured to send and/or receive data to and/or from user input devices such as a keyboard, a keypad, a touch screen, a computer mouse, a track ball, a joystick, a camera, a voice recognition module, and/or other similar devices. The user interface module 602 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. The user interface module 602 can also be configured to generate audible output(s), such as a speaker, speaker jack, audio output port, audio output device, earphones, and/or other similar devices.

The network-communications interface module 604 can include one or more wireless interfaces 616 and/or one or more wireline interfaces 618 that are configurable to communicate via a network. The wireless interfaces 616 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. The wireline interfaces 618 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, the network communications interface module 604 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

The processors 606 can include one or more general purpose processors, and/or one or more special purpose processors (e.g., digital signal processors, graphics processing units, application specific integrated circuits, etc.). The processors 606 can be configured to execute computer-readable program instructions 620 that are contained in the data storage 608 and/or other instructions as described herein.

The data storage 608 can include one or more computer-readable storage media that can be read and/or accessed by at least one of processors 606. The one or more computer-readable storage media can include volatile and/or non-volatile storage components, such as optical, magnetic, organic or other memory or disc storage, which can be integrated in whole or in part with at least one of the processors 606. In some embodiments, the data storage 608 can be implemented using a single physical device (e.g., one optical, magnetic, organic or other memory or disc storage unit), while in other embodiments, the data storage 608 can be implemented using two or more physical devices.

The data storage 608 can include computer-readable program instructions 620 and perhaps additional data. In some embodiments, the data storage 608 can additionally include storage required to perform at least part of the herein-described methods and techniques and/or at least part of the functionality of the devices and networks.

In some embodiments, the computing device 600 can include one or more sensors 610. The sensor(s) 610 can be configured to measure conditions in an environment for the computing device 600 and provide data about that environment; e.g., environment 100. For example, the sensor(s) 610 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 600, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of the computing device 600, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 610 are possible as well.

The computing device 600 can include one or more actuators 612 that enable the computing device 600 to initiate movement. For example, the actuator(s) 612 can include or be incorporated with robotic joints connecting robotic limbs to a robotic body. For example, the actuator(s) 612 can include respective robotic hip and robotic shoulder joints connecting respective robotic legs and arms to the robotic body. Further, the actuator(s) 612 can include respective robotic knee joints connecting respective portions of the robotic legs (e.g., robotic thighs and robotic calves) and elbow joints connecting portions of the robotic arms (e.g., robotic forearms and upper arms). Yet further, the actuator(s) 612 can include respective robotic ankle joints connecting the robotic legs to robotic feet and respective robotic wrist joints connecting the robotic arms to robotic hands. In addition, the actuator(s) 612 can include motors for moving the robotic limbs. As such, the actuator(s) 612 can enable mobility of the computing device 600. Many other examples of actuator(s) 612 are possible as well.

V. Example Methods of Operation

FIG. 7 is a flowchart of a method 700, in accordance with an example embodiment. The method 700 can be executed by a computing device, such as robotic device 102 and/or computing device 600. The method 700 can begin at block 710, where a computing device can receive a map of a horizontal marker plane that includes mapped positions of a first marker and a second marker arranged in the horizontal marker plane, such as discussed above at least in the context of FIGS. 2A, 2B, and 4A.

At block 720, the computing device can receive, from a sensor configured to scan a two-dimensional sensor plane, sensor data indicative of positions of the first and second markers relative to the sensor, such as discussed above at least in the context of FIGS. 1, 2B, 3, and 5A-5C.

At block 730, the computing device can determine measured positions of the first and second markers relative to the map based on the sensor data and a current position of the sensor relative to the map, such as discussed above at least in the context of FIGS. 2B, 3, and 4A.

At block 740, the computing device can determine a difference vector between a first vector that connects the mapped positions of the first and second markers and a second vector that connects the measured positions of the first and second markers, such as discussed above at least in the context of FIGS. 2B, 3, and 4A-4D.

At block 750, the computing device can determine, based on the determined distance vector, an orientation of the two-dimensional sensor plane relative to the horizontal marker plane, such as discussed above at least in the context of FIGS. 3 and 5A-5C.

In some embodiments, method 700 can further include: after receiving the sensor data from the sensor at a first time, receiving second sensor data indicative of positions of the first and second markers relative to the sensor at a second time; determining, based on the second sensor data, a second orientation of the two-dimensional sensor plane relative to the horizontal marker plane; determining, based on a similarity between the determined orientation of the two-dimensional sensor plane relative to the horizontal plane and the determined second orientation of the two-dimensional sensor plane relative to the horizontal plane, that the sensor is improperly mounted to the first robotic device; and determining, based on at least one of the determined orientation and the determined second orientation, a mounting angle of the sensor relative to the horizontal plane, such as discussed above at least in the context of FIG. 5A.

In other embodiments, method 700 can further include: after receiving the sensor data from the sensor at a first time, receiving second sensor data indicative of positions of the first and second markers relative to the sensor at a second time; determining, based on the second sensor data, a second orientation of the two-dimensional sensor plane relative to the horizontal marker plane; determining, based on a difference between the determined orientation of the two-dimensional sensor plane relative to the horizontal plane and the determined second orientation of the two-dimensional sensor plane relative to the horizontal plane, that the sensor is moving relative to the horizontal marker plane; after receiving the second sensor data from the sensor at the second time, receiving third sensor data indicative of positions of the first and second markers relative to the sensor at a third time; determining, based on the third sensor data, a third orientation of the two-dimensional sensor plane relative to the horizontal marker plane; and determining, based on a second difference between the determined second orientation of the two-dimensional sensor plane relative to the horizontal plane and the determined third orientation of the two-dimensional sensor plane relative to the horizontal plane, that the sensor is oscillating relative to the horizontal marker plane, such as discussed above at least in the context of FIG. 5B.

In still other embodiments, the sensor can be coupled to a first robotic device, wherein the sensor data is received when the first robotic device is at a particular location relative to the map, and method 700 can further include: receiving, from a second sensor configured to scan a second two-dimensional sensor plane, second sensor data indicative of positions of the first and second markers relative to the second sensor, wherein the second sensor is coupled to a second robotic device, and wherein the second sensor data is received when the second robotic device is at the particular location relative to the map; determining, based on the second sensor data, an orientation of the second two-dimensional sensor plane relative to the horizontal marker plane; determining, based on a similarity between the determined orientations of the two-dimensional sensor plane and the second two-dimensional sensor plane relative to the horizontal plane, that a ground surface at the particular location is uneven; and determining, based on at least one of the determined orientations of the two-dimensional sensor plane and the second two-dimensional sensor plane relative to the horizontal plane, a slope of the ground surface at the particular location, such as discussed above at least in the context of FIG. 5C.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the diagrams, scenarios, and flow charts discussed herein, and these diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method comprising:
   receiving a map of a horizontal marker plane that includes mapped positions of a first marker and a second marker arranged in the horizontal marker plane;
   receiving, from a sensor configured to scan a two-dimensional sensor plane, sensor data indicative of positions of the first and second markers relative to the sensor;
   determining measured positions of the first and second markers relative to the map based on the sensor data and a current position of the sensor relative to the map;
   determining a difference vector between a first vector that connects the mapped positions of the first and second markers and a second vector that connects the measured positions of the first and second markers;
   determining, based on the determined difference vector, an orientation of the two-dimensional sensor plane relative to the horizontal marker plane;
   detecting, based on the determined orientation of the two-dimensional sensor plane relative to the horizontal marker plane, an uneven ground surface; and
   navigating a robotic device based on detecting the uneven ground surface.

2. The method of claim 1, wherein the map of the horizontal marker plane further includes mapped positions of at least a third marker arranged in the horizontal marker plane, the method further comprising:
   receiving, from the sensor, sensor data indicative of a position of the third marker relative to the sensor; and
   determining the current position of the sensor relative to the map based on the sensor data indicative of the positions of the first, second, and third markers.

3. The method of claim 1, further comprising determining, based on a non-zero magnitude of the determined difference vector, that the sensor is vertically tilted relative to the horizontal marker plane.

4. The method of claim 1, further comprising determining, based on the determined difference vector, a pitch angle of the sensor relative to the horizontal marker plane and a roll angle of the sensor relative to the horizontal marker plane.

5. The method of claim 1, further comprising:
   after receiving the sensor data from the sensor at a first time, receiving second sensor data indicative of positions of the first and second markers relative to the sensor at a second time; and
   determining, based on the second sensor data, a second orientation of the two-dimensional sensor plane relative to the horizontal marker plane.

6. The method of claim 5, further comprising determining, based on a similarity between the determined orientation of the two-dimensional sensor plane relative to the horizontal marker plane and the determined second orientation of the two-dimensional sensor plane relative to the horizontal marker plane, that the sensor is improperly mounted to the robotic device.

7. The method of claim 5, further comprising determining, based on at least one of the determined orientation and the determined second orientation, a mounting angle of the sensor relative to the horizontal marker plane.

8. The method of claim 5, further comprising determining, based on a difference between the determined orientation of the two-dimensional sensor plane relative to the horizontal marker plane and the determined second orientation of the two-dimensional sensor plane relative to the horizontal marker plane, that the sensor is moving relative to the horizontal marker plane.

9. The method of claim 5, further comprising:
   after receiving the second sensor data from the sensor at the second time, receiving third sensor data indicative of positions of the first and second markers relative to the sensor at a third time;
   determining, based on the third sensor data, a third orientation of the two-dimensional sensor plane relative to the horizontal marker plane; and
   determining, based on a second difference between the determined second orientation of the two-dimensional sensor plane relative to the horizontal marker plane and the determined third orientation of the two-dimensional sensor plane relative to the horizontal marker plane, that the sensor is oscillating relative to the horizontal marker plane.

10. The method of claim 1, wherein the robotic device is a first robotic device, and wherein the sensor data is received when the first robotic device is at a particular location relative to the map, the method further comprising:
    receiving, from a second sensor configured to scan a second two-dimensional sensor plane, second sensor data indicative of positions of the first and second markers relative to the second sensor, wherein the second sensor is coupled to a second robotic device, and wherein the second sensor data is received when the second robotic device is at the particular location relative to the map; and
    determining, based on the second sensor data, an orientation of the second two-dimensional sensor plane relative to the horizontal marker plane.

11. The method of claim 10, wherein the uneven ground surface is detected based on a similarity between the determined orientations of the two-dimensional sensor plane and the second two-dimensional sensor plane relative to the horizontal marker plane.

12. The method of claim 10, further comprising determining, based on at least one of the determined orientations of the two-dimensional sensor plane and the second two-dimensional sensor plane relative to the horizontal marker plane, a slope of the uneven ground surface at the particular location.

13. A robotic device comprising:
    a sensor configured to scan a two-dimensional sensor plane; and
    a control system configured to:
      receive a map of a horizontal marker plane that includes mapped positions of a first marker and a second marker arranged in the horizontal marker plane;
      receive, from the sensor, sensor data indicative of positions of the first and second markers relative to the sensor;

determine measured positions of the first and second markers relative to the map based on the sensor data and a current position of the sensor relative to the map;

determine a difference vector between a first vector that connects the mapped positions of the first and second markers and a second vector that connects the measured positions of the first and second markers;

determine, based on the determined difference vector, an orientation of the two-dimensional sensor plane relative to the horizontal marker plane;

detect, based on the determined orientation of the two-dimensional sensor plane relative to the horizontal marker plane, an uneven ground surface; and navigate based on detecting the uneven ground surface.

14. The robotic device of claim 13, wherein the control system is further configured to determine, based on the determined difference vector, a pitch angle of the sensor relative to the horizontal marker plane and a roll angle of the sensor relative to the horizontal marker plane.

15. The robotic device of claim 13, wherein the control system is further configured to:
after receiving the sensor data from the sensor at a first time, receive second sensor data indicative of positions of the first and second markers relative to the sensor at a second time; and
determine, based on the second sensor data, a second orientation of the two-dimensional sensor plane relative to the horizontal marker plane.

16. The robotic device of claim 15, wherein the control system is further configured to determine, based on a difference between the determined orientation of the two-dimensional sensor plane relative to the horizontal marker plane and the determined second orientation of the two-dimensional sensor plane relative to the horizontal marker plane, that the sensor is oscillating relative to the horizontal marker plane.

17. The robotic device of claim 13, wherein the robotic device is configured to transport a load across a ground surface, and wherein the control system is further configured to determine, based on the determined difference vector, that the load is causing the robotic device to tilt relative to a ground surface.

18. A system comprising:
a first marker and a second marker arranged in a horizontal marker plane;
a robotic device comprising a sensor configured to scan a two-dimensional sensor plane; and
a control system configured to:
receive a map of a horizontal marker plane that includes mapped positions of the first marker and the second marker arranged in the horizontal marker plane;
receive, from the sensor, sensor data indicative of positions of the first and second markers relative to the sensor;
determine measured positions of the first and second markers relative to the map based on the sensor data and a current position of the sensor relative to the map;
determine a difference vector between a first vector that connects the mapped positions of the first and second markers and a second vector that connects the measured positions of the first and second markers;
determine, based on the determined difference vector, an orientation of the two-dimensional sensor plane relative to the horizontal marker plane;
detect, based on the determined orientation of the two-dimensional sensor plane relative to the horizontal marker plane, an uneven ground surface; and
cause the robotic device to navigate based on detecting the uneven ground surface.

19. The system of claim 18, wherein the control system is further configured to determine, based on the determined difference vector, a pitch angle of the sensor relative to the horizontal marker plane and a roll angle of the sensor relative to the horizontal marker plane.

20. The system of claim 18, wherein the control system is further configured to:
after receiving the sensor data from the sensor at a first time, receive second sensor data indicative of positions of the first and second markers relative to the sensor at a second time; and
determine, based on the second sensor data, a second orientation of the two-dimensional sensor plane relative to the horizontal marker plane.

* * * * *